(12) United States Patent
Kurabayashi et al.

(10) Patent No.: US 12,175,215 B2
(45) Date of Patent: Dec. 24, 2024

(54) PROGRAM GENERATION APPARATUS, PROGRAM GENERATION METHOD AND PROGRAM

(71) Applicant: NIPPON TELEGRAPH AND TELEPHONE CORPORATION, Tokyo (JP)

(72) Inventors: Toshiyuki Kurabayashi, Tokyo (JP); Hiroyuki Kirinuki, Tokyo (JP); Yu Yoshimura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 161 days.

(21) Appl. No.: 17/798,550

(22) PCT Filed: Feb. 12, 2020

(86) PCT No.: PCT/JP2020/005388
§ 371 (c)(1),
(2) Date: Aug. 9, 2022

(87) PCT Pub. No.: WO2021/161428
PCT Pub. Date: Aug. 19, 2021

(65) Prior Publication Data
US 2023/0342117 A1    Oct. 26, 2023

(51) Int. Cl.
*G06F 9/44*    (2018.01)
*G06F 8/30*    (2018.01)
(Continued)

(52) U.S. Cl.
CPC .................. *G06F 8/36* (2013.01); *G06F 8/31* (2013.01); *G06F 8/42* (2013.01)

(58) Field of Classification Search
None
See application file for complete search history.

(56) References Cited

U.S. PATENT DOCUMENTS 5,790,760 A     8/1998   Arima
10,466,972 B2 * 11/2019  Miyamoto ............. G06N 3/126
(Continued)

FOREIGN PATENT DOCUMENTS

JP    H08234975 A    9/1996

OTHER PUBLICATIONS

Fudaba et al. (2016) "Source code generation from natural language using statistical machine translation" Proceedings of the 22nd Annual Meeting of the Association for Natural Language Processing, Feb. 29, 2016 [online] website: https://ahcweb01.naist.jp/papers/conference/2015/201603_NLP_Fudaba_1/201603_NLP_Fudaba_1.paper.pdf.

(Continued)

*Primary Examiner* — Qamrun Nahar

(57) ABSTRACT

The possibility of a desired program being automatically generated is increased by a program generation device including: a search unit configured to search for a first program that corresponds to a specification written in natural language similar to natural language that describes a specification of a program to be generated, from a set of pairs each constituted by natural language that describes a specification of a program and the program that satisfies syntax of a programing language; and a change unit configured to change the first program to generate a second program that satisfies at least one pair of an input value and an output value.

15 Claims, 9 Drawing Sheets

(51) Int. Cl.
*G06F 8/36* (2018.01)
*G06F 8/41* (2018.01)

(56) References Cited

U.S. PATENT DOCUMENTS

| | | | | |
|---|---|---|---|---|
| 11,144,810 | B2* | 10/2021 | Ahn | G06N 3/006 |
| 11,669,332 | B1* | 6/2023 | Aiyer | G06F 8/41 |
| | | | | 717/120 |
| 2005/0131672 | A1* | 6/2005 | Dalal | G06F 40/284 |
| | | | | 704/2 |
| 2009/0299729 | A1* | 12/2009 | Quirk | G06F 40/45 |
| | | | | 704/9 |
| 2017/0039188 | A1* | 2/2017 | Allen | G06F 40/263 |
| 2017/0277681 | A1* | 9/2017 | Wolfram | G06F 40/40 |
| 2018/0107457 | A1* | 4/2018 | Barad | G06F 8/30 |
| 2020/0004831 | A1* | 1/2020 | Burceanu | G06F 40/42 |

OTHER PUBLICATIONS

Sumit Gulwani (2011) "Automating String Processing in Spreadsheets Using Input-Output Examples" POPL '11 Proceedings of the 38th annual ACM SIGPLAN-SIGACT symposium on Principles of programming languages, Jan. 26, 2011 [online] website: https://dl.acm.org/citation.cfm?id=1926423.

Matsumoto et al. (2018) "Automatic programming by reusing and processing existing methods" Information Processing Society of Japan Software Engineering Symposium 2018 Proceedings, Aug. 29, 2018.

\* cited by examiner

Fig. 5

| | | 15 |
|---|---|---|
| | SEARCH DATA SET | |
| SPECIFICATION | RETURN SQUARE OF INPUT VALUE | |
| PROGRAM (SOURCE CODE) | def getSquare(x):<br>    return multiply(x, x) | |
| SPECIFICATION | DETERMINE WHETHER INPUT VALUE IS EVEN NUMBER | |
| PROGRAM (SOURCE CODE) | def judgeEven(x):<br>    return (mod(x, 2)==0) | |

```
                    INPUT-OUTPUT
                    EXAMPLE SET
    INPUT-OUTPUT      INPUT EXAMPLE: 1
    EXAMPLE 1         OUTPUT EXAMPLE: 2

INPUT-OUTPUT      INPUT EXAMPLE: 3
    EXAMPLE 2         OUTPUT EXAMPLE: 10

INPUT-OUTPUT      INPUT EXAMPLE: 10
    EXAMPLE 3         OUTPUT EXAMPLE: 101
                              ⋮
```

PROGRAM GENERATION APPARATUS, PROGRAM GENERATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/005388, filed on 12 Feb. 2020, the disclosure of which is hereby incorporated herein by reference in its entirety.

TECHNICAL FIELD

The present invention relates to a program generation device, a program generation method, and a program.

BACKGROUND ART

In recent years, application of IT is increasing throughout the society and insufficiency of IT human resources is a big issue. According to a calculation made by the Ministry of Economy, Trade and Industry, it is estimated that there will be a lack of about 360,000 IT human resources in 2025. In particular, the shortage of IT human resources in implementation processes for which expertise is required is an urgent issue, and there are demands for research and development of automatic programing technologies for automatically carrying out programing.

Conventionally known automatic programing technologies include automatic programing in which natural language is used and automatic programing in which input-output examples are used.

In automatic programing in which natural language is used, a program is automatically generated from a specification that is written in natural language by a user. For example, NPL 1 discloses a technology that makes it possible to automatically generate a program from natural language by learning a relationship between natural language and a corresponding program using a machine translation model.

In automatic programing in which input-output examples are used, at least one specific input-output example of a program is given from a user, and program components are composited so as to satisfy the input-output example. For example, NPL 2 discloses a technology for automatically synthesizing an Excel (registered trademark) function that satisfies a given input-output example.

CITATION LIST

Non Patent Literature

[NPL 1] Hiroyuki FUDABA, Yusuke ODA, Graham Neubig, Koichiro YOSHINO, Satoshi NAKAMURA, "Source Code Generation from Natural Language Using Statistical Machine Translation", Proceedings of the 22nd Annual Meeting of the Association for Natural Language Processing (March 2016), [online], Internet <URL:https://ahcweb01.naist.jp/papers/conference/2015/201603 NLP_Fudaba_1/201603_NLP_Fudaba_1.paper.pdf>

[NPL 2] Sumit Gulwani, "Automating String Processing in Spreadsheets Using Input-Output Examples" POPL '11 Proceedings of the 38th annual ACM SIGPLAN-SIGACT symposium on Principles of programming languages Pages 317-330, [online], Internet <URL:https://dl.acm.org/citation.cfm?id=1926423>

SUMMARY OF THE INVENTION

Technical Problem

However, it is difficult to generate a correct program from natural language that is ambiguous information, and there are cases where a program that does not satisfy the syntax of a programing language is generated.

Also, input-output examples are merely examples of a specification satisfied by the program, and there is a shortcoming in that the amount of information is small. Therefore, there are cases where a program that is overfitted to the input-output examples is generated.

The present invention was made in view of the foregoing, and has an object of increasing the possibility of the desired program being automatically generated.

Means for Solving the Problem

In order to solve the problem described above, a program generation device includes: a search unit configured to search for a first program that corresponds to a specification written in natural language similar to natural language that describes a specification of a program to be generated, from a set of pairs each constituted by natural language that describes a specification of a program and the program that satisfies syntax of a programing language; and a change unit configured to change the first program to generate a second program that satisfies at least one pair of an input value and an output value.

Effects of the Invention

The possibility of the desired program being automatically generated can be increased.

BRIEF DESCRIPTION OF DRAWINGS

FIG. 5 is a diagram showing an example of a search data set 15.

FIG. 7 is a diagram showing an example of an input-output example set.

DESCRIPTION OF EMBODIMENTS

Figure 1:
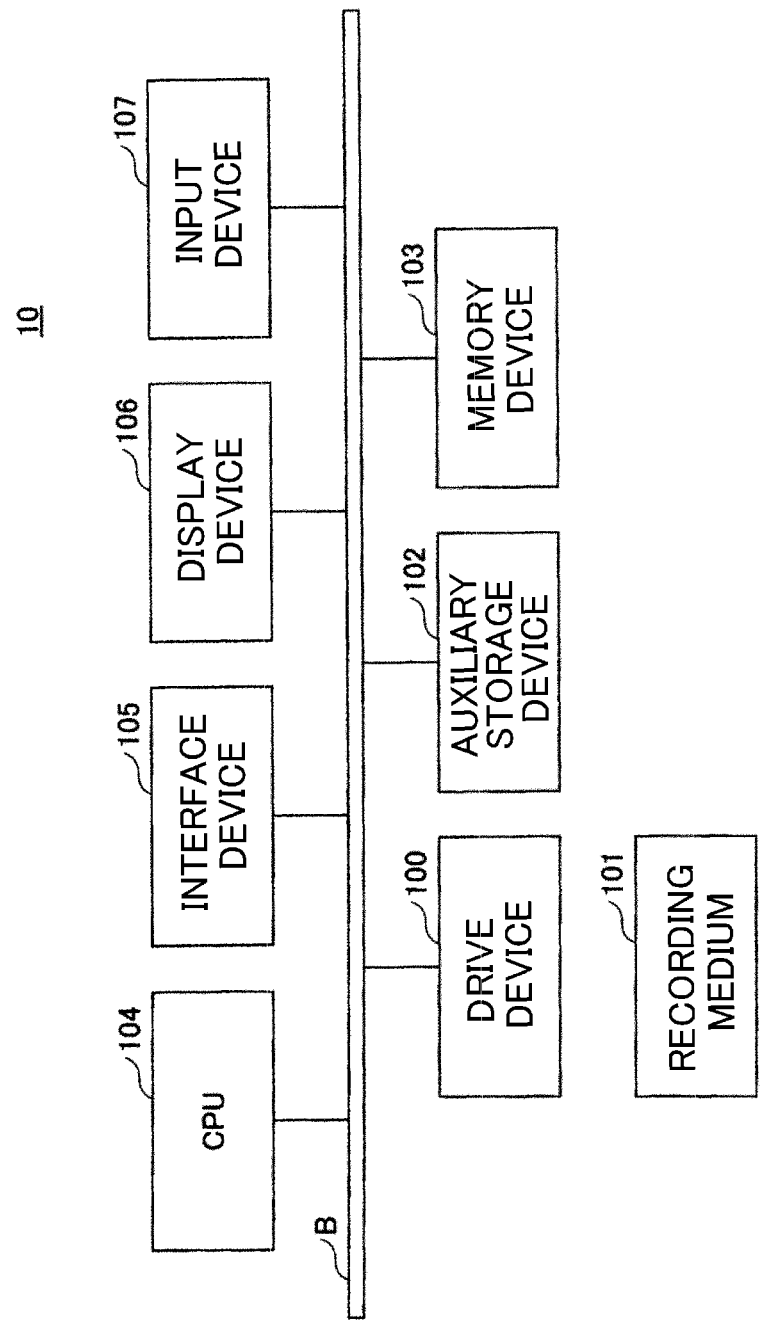
FIG. 1 is a diagram showing an example of a hardware configuration of a program generation device 10 in an embodiment of the present invention.

The following describes an embodiment of the present invention based on the drawings. FIG. 1 is a diagram showing an example of a hardware configuration of a program generation device 10 in the embodiment of the present invention. The program generation device 10 shown in FIG. 1 includes a drive device 100, an auxiliary storage device 102, a memory device 103, a CPU 104, an interface device 105, a display device 106, an input device 107, and the like, which are connected to each other via a bus B.

A program that realizes processing performed in the program generation device 10 is provided using a recording medium 101 such as a CD-ROM. When the recording medium 101 on which the program is stored is set in the drive device 100, the program is installed in the auxiliary storage device 102 from the recording medium 101 via the drive device 100. However, the program does not necessarily have to be installed from the recording medium 101, and may be downloaded from another computer via a network. The auxiliary storage device 102 stores therein the installed program and necessary files, data, and the like.

When a program start instruction is given, the memory device 103 reads the program from the auxiliary storage device 102 and stores the program in the memory device 103. The CPU 104 realizes functions relating to the program generation device 10 in accordance with the program stored in the memory device 103. The interface device 105 is used as an interface for connection to a network. The display device 106 displays GUI (Graphical User Interface) or the like of the program. The input device 107 is constituted by a keyboard and a mouse, for example, and is used to input various operation instructions.

Figure 2:
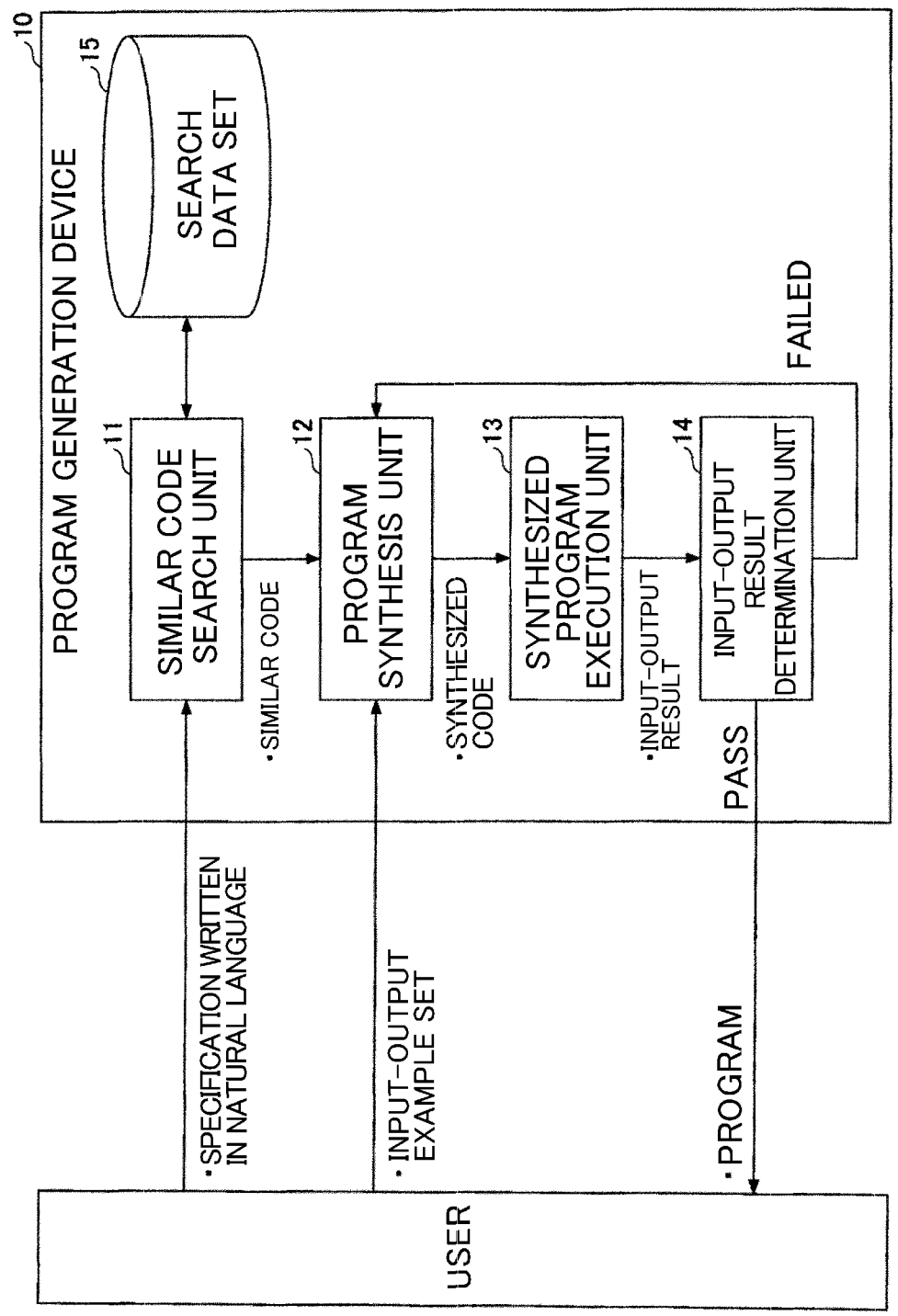
FIG. 2 is a diagram showing an example of a functional configuration of the program generation device 10 in an embodiment of the present invention.

FIG. 2 is a diagram showing an example of a functional configuration of the program generation device 10 in the embodiment of the present invention. The program generation device 10 shown in FIG. 2 includes a similar code search unit 11, a program synthesis unit 12, a synthesized program execution unit 13, and an input-output result determination unit 14. These units are realized through processing that one or more programs installed in the program generation device 10 cause the CPU 104 to execute.

The program generation device 10 also includes a search data set 15. As described later, the search data set 15 is a set of search data pieces that are each expressed as a pair of a program (a source code of the program) that is syntactically correct (i.e., satisfies the syntax of a programming language) and a specification of the program written in natural language. The search data set 15 is stored in the auxiliary storage device 102, for example.

Figure 3:
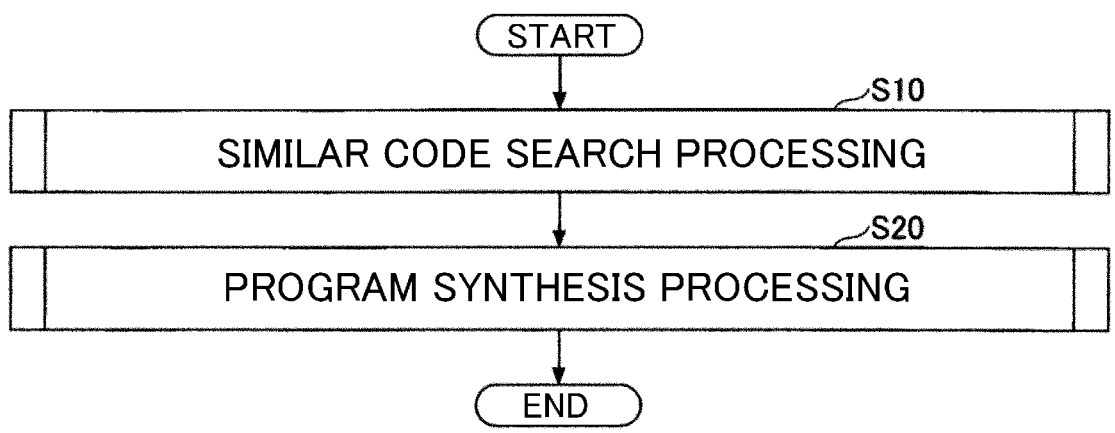
FIG. 3 is a flowchart showing an example of a processing procedure executed by the program generation device 10.

The following describes a processing procedure that is executed by the program generation device 10. FIG. 3 is a flowchart showing an example of the processing procedure executed by the program generation device 10.

First, the similar code search unit 11 executes similar code search processing (step S10). In the similar code search processing, a specification that is written in natural language for the program to be generated (hereinafter referred to as the "target program") is input, and a source code (hereinafter referred to as a "similar code") of a program that has a specification similar to the specification of the target program is found from the search data set 15. The similar code is a source code that serves as a basis (source) when the target program is automatically generated.

Subsequently, the program synthesis unit 12, the synthesized program execution unit 13, and the input-output result determination unit 14 execute program synthesis processing (step S20). In the program synthesis processing, the target program that satisfies the specification (intention of the creator) is automatically generated by using the similar code found through the similar code search processing, as a basis, and repeating a partial change of the similar code (cumulatively changing the similar code portion by portion) until a program that satisfies input-output examples (at least one pair of an input value and an output value) generated in advance is generated.

That is, in the present embodiment, the possibility of a program conforming to the specification being generated is increased using two types of information, i.e., the specification of the target program written in natural language and input-output examples.

Figure 4:
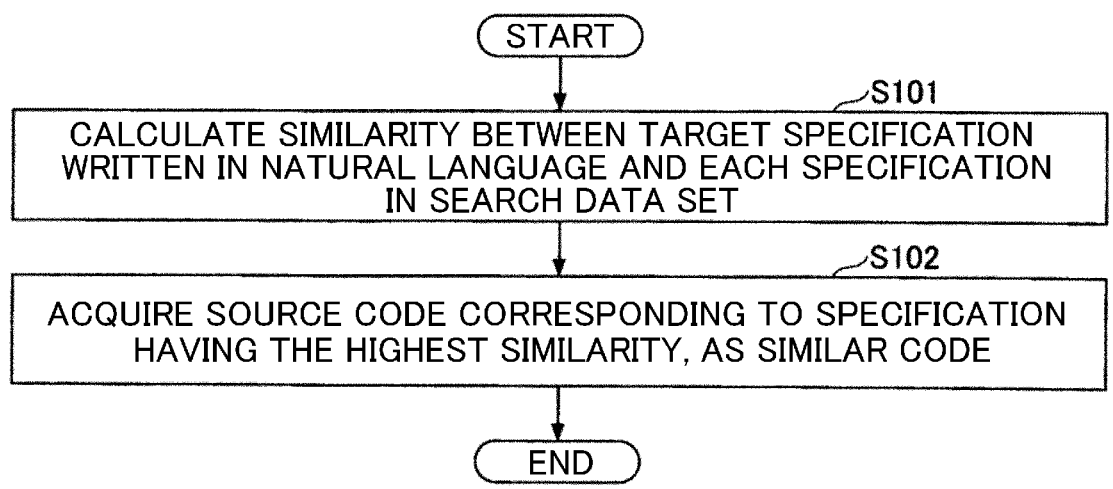
FIG. 4 is a flowchart showing an example of a processing procedure of similar code search processing.

Next, details of step S10 shown in FIG. 3 will be described. FIG. 4 is a flowchart showing an example of a processing procedure of the similar code search processing.

In step S101, the similar code search unit 11 calculates similarity between the specification (hereinafter referred to as the "target specification") written in natural language for the target program and each of specifications included in respective search data pieces constituting the search data set 15.

FIG. 5 is a diagram showing an example of the search data set 15. In FIG. 5, each table in the search data set 15 corresponds to a single piece of search data. The following is the data structure of the search data set 15 written in a form that is based on the BNF (Backus-Naur form) notation.
<search data set>::=[specification source code]+

That is, the search data set 15 is a set of search data pieces that each include a specification (hereinafter referred to as a "search specification") written in natural language and a source code of a program. It should be noted that the source code of the program satisfies the syntax of a programming language, as described above. Such a search data set 15 is prepared in advance.

It should be noted that similarity between the target specification and each search specification can be calculated using a suitable method. For example, the target specification and the search specification can be converted to vectors using TF-IDF, and cosine similarity between a vector corresponding to the target specification and a vector corresponding to the search specification can be calculated as the similarity between the target specification and the search specification.

Subsequently, the similar code search unit 11 acquires a source code that corresponds to a search specification having the highest similarity as a similar code from the search data set 15 (step S102). That is, the similar code search unit 11 identifies search data that includes the search specification having the highest similarity, and then acquires a source code included in the identified search data as the similar code from the search data set 15. Thus, out of source codes included in the search data set 15, the source code of the specification that is the most similar to the specification of the target program is obtained as the similar code.

Figure 6:
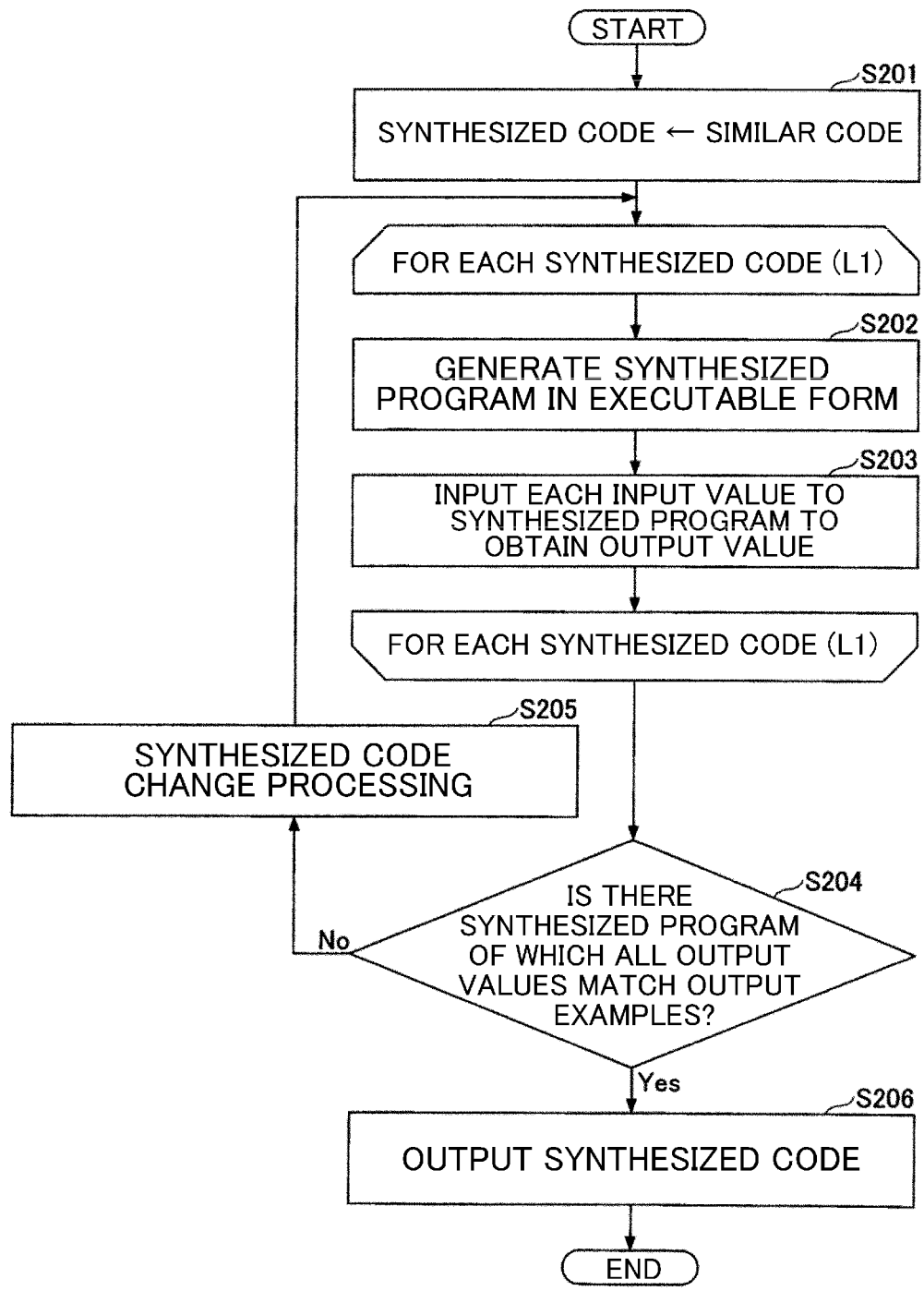
FIG. 6 is a flowchart showing an example of a processing procedure of program synthesis processing.

Next, details of step S20 shown in FIG. 3 will be described. FIG. 6 is a flowchart showing an example of a processing procedure of the program synthesis processing.

In step S201, the program synthesis unit 12 takes the similar code to be a synthesized code. The processing performed in step S201 is merely a change of the name.

Subsequently, loop processing L1 that includes steps S202 and S203 is executed for each synthesized code. In the following description, a synthesized code for which the loop processing L1 is performed will be referred to as a "target code". When the loop processing L1 is executed for the first time, the synthesized code is the single similar code.

In step S202, the synthesized program execution unit 13 generates a program (hereinafter referred to as a "synthesized program") in an executable form by performing compiling, linking, and the like on the target code.

Subsequently, the synthesized program execution unit 13 executes the synthesized program (hereinafter referred to as the "target synthesized program") by inputting an input value of each input-output example included in an input-output example set that is prepared in advance, to the target synthesized program, and obtains an output value for each input-output example (step S203). The input-output example set is information that indicates conditions to be satisfied by the target program with respect to input and output, and is set in advance and stored in the auxiliary storage device 102, for example.

FIG. 7 is a diagram showing an example of the input-output example set. The following is the data structure of the input-output example set shown in FIG. 7, which is written in a form that is based on the BNF notation. <input-output example set>::=<input-output example>+<input-output example>::=<input example><output example><input example>::=input value+<output example>::=output value+

That is, the input-output example set includes one or more input-out examples. Each input-output example is a pair of an input example and an output example. The input example is one or more input values, and the output example is one or more output values.

For example, in a case where the input-output example set includes M input-output examples, in step S203, the synthesized program execution unit 13 executes the target synthesized program for each of M input values by inputting the input values, and obtains M output values.

When the loop processing L1 has ended, the input-output result determination unit 14 determines whether there is a synthesized program for which all output values match output examples of input-output examples to which input values corresponding to the output values belong (step S204). That is, it is determined whether there is a synthesized program for which all output values obtained in step S203 were as expected (correct), among synthesized programs for which the loop processing L1 has been performed. It should be noted that when step S204 is executed for the first time, the loop processing L1 is performed on only one synthesized program generated based on the similar code. Accordingly, in this case, the determination is performed on input-output results of this synthesized program in step S204.

If there is no synthesized program that satisfies the condition of step S304 (No in step S204), the program synthesis unit 12 executes synthesized code change processing (step S205). In the synthesized code change processing, a plurality of (N) synthesized codes are generated by partially changing the original synthesized code. For example, a genetic algorithm may be used to partially change the synthesized code. That is, a genetic operation may be performed N times on the synthesized code of the previous generation to generate N synthesized codes of the next generation. Here, N represents the number of individuals (source codes) of a single generation of the genetic algorithm. At this time, each synthesized code to which the genetic algorithm is applied is expressed using a tree structure in which an operator serves as a parent node and a variable, a constant, or an operator for which an operation is performed using the operator serves as a child node, for example, and the genetic operation is performed on a subtree of the tree structure. A pass rate of output values (a rate at which the output values were correct) may be used in evaluation for selecting individuals on which the genetic operation is performed N times.

For example, program components included in a program component list that is stored in the auxiliary storage device 102 in advance are used as candidates that replace a portion of the synthesized code of the previous generation in mutations.

Figure 8:
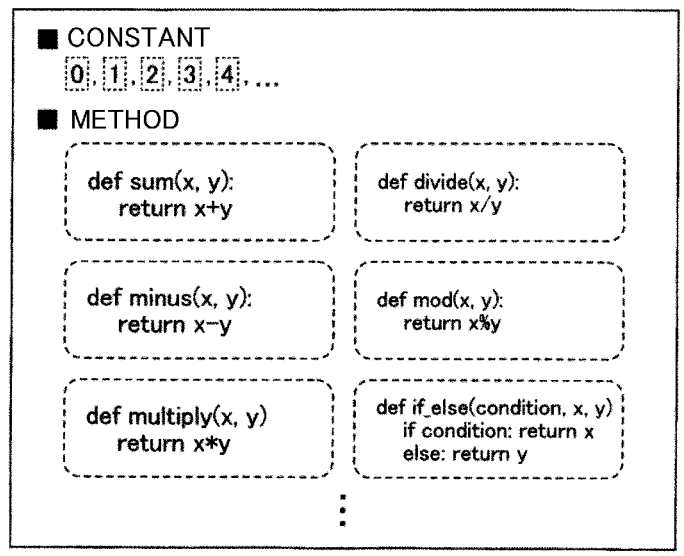
FIG. 8 is a diagram showing an example of a program component list.

FIG. 8 is a diagram showing an example of the program component list. The following is the data structure of the program component list shown in FIG. 8, which is written in a form that is based on the BNF notation. <program component list>::=program component+

That is, the program component list includes one or more program components (source codes of the program components). In FIG. 8, the program components are categorized into constants and methods. Here, a single constant corresponds to a single program component, and a single method corresponds to a single program component. That is, each unit surrounded by a dashed line in FIG. 8 corresponds to a unit of a single program component.

It should be noted that when step S205 is executed for the first time, the individual (synthesized code) of the previous generation is the single similar code. Accordingly, in this case, N identical synthesized codes can be generated by copying the similar code, and the genetic operation can be performed N times on the N synthesized codes. As a result, N new synthesized programs are generated.

Figure 9:
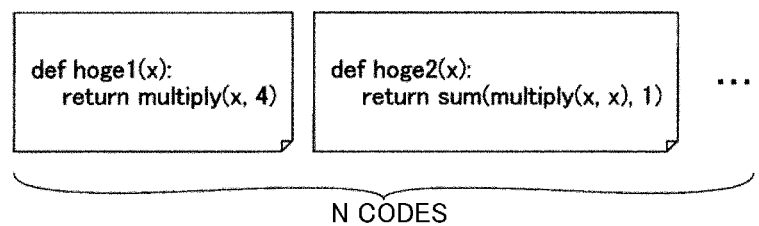
FIG. 9 is a diagram showing an example of synthesized codes that are generated through synthesized code change processing.

FIG. 9 is a diagram showing an example of synthesized codes generated through the synthesized code change processing. As shown in FIG. 9, N synthesized codes are generated as a result of synthesis processing being performed once.

It should be noted that an existing library such as DEAP (https://deap.readthedocs.io/en/master/) may be used for program synthesis processing in which the genetic algorithm is used.

Subsequently, the loop processing L1 and the following processing are executed for the N synthesized codes. Accordingly, in this case, steps S202 and S203 are executed N times.

On the other hand, if there is a synthesized program that satisfies the condition of step S204 (Yes in step S204), the input-output result determination unit 14 outputs the source code (synthesized code) of the synthesized program (step S206). That is, the synthesized program is determined to be the target program. If there are a plurality of synthesized programs that satisfy the condition of step S204, source codes of the respective synthesized programs can be output.

For example, in a case where the three input-output examples shown in FIG. 7 are all of the input-output examples constituting the input-output example set, the second synthesized code from the left in FIG. 9 is output as the target program (source code of the target program).

As described above, according to the present embodiment, a program that is expected to satisfy a specification of a program is automatically generated using two types of information, i.e., the specification (character string) of the program written in natural language and input-output examples. That is, a source code of a specification that is written in natural language similar to the natural language describing the specification of the program (intention of the creator) is found from the search data set 15 that includes syntactically correct source codes and specifications of the source codes, and then a program is repeatedly modified (changed) based on the found source code until a program that satisfies all input-output examples is generated. As a result, it is possible to increase the possibility of the desired program (i.e., program that is syntactically correct and satisfies desired input-output examples) being automatically generated, when compared to conventional technologies.

It should be noted that in the present embodiment, the similar code is an example of a first program. The similar code search unit 11 is an example of a search unit. The program synthesis unit 12 is an example of a change unit. The target program is an example of a second program.

Although an embodiment of the present invention has been described in detail, the present invention is not limited to the specific embodiment, and various alterations and changes can be made within the scope of the gist of the present invention described in the claims.

REFERENCE SIGNS LIST

10 Program generation device
11 Similar code search unit
12 Program synthesis unit
13 Synthesized program execution unit
14 Input-output result determination unit
15 Search data set
100 Drive device
101 Recording medium
102 Auxiliary storage device
103 Memory device
104 CPU
105 Interface device
106 Display device
107 Input device
B Bus

The invention claimed is:

1. A program generation device comprising a processor configured to execute a method comprising:
   searching for a first program that corresponds to a specification written in a first natural language similar to a second natural language that describes the specification of a program to be generated, from a set of pairs each including the second natural language that describes the specification of the program and the program that satisfies syntax of a programing language; and
   changing the first program to generate a second program that satisfies a character string written in natural language and at least one pair of an input value and an output value.

2. The program generation device according to claim 1, wherein the changing further comprises repeating a partial change of the first program in a cumulative manner until the second program is generated.

3. The program generation device according to claim 2, wherein the changing further comprises changing a portion of the first program using a plurality of program components.

4. A computer implemented method for generating a program, comprising:
   searching for a first program, wherein the first program corresponds to a specification written in a first natural language similar to a second natural language that describes the specification of the program to be generated, from a set of pairs each including the second natural language that describes the specification of the program and the program that satisfies syntax or a programing language; and
   changing the first program to generate a second program that satisfies a character string written in natural language and at least one pair of an input value and an output value.

5. The computer implemented method according to claim 4, wherein
   the changing further comprises repeating a partial change of the first program in a cumulative manner until the second program is generated.

6. The computer implemented method according to claim 5, wherein
   the changing further comprises changing a portion of the first program using a plurality of program components.

7. A computer-readable non-transitory recording medium storing computer-executable program instructions that when executed by a processor cause a computer to execute a method comprising:
   searching for a first program that corresponds to a specification written in a first natural language similar to a second natural language that describes the specification of a program to be generated, from a set of pairs each including the second natural language that describes the specification of the program and the program that satisfies syntax of a programing language; and
   changing the first program to generate a second program that satisfies a character string written in natural language and at least one pair of an input value and an output value.

8. The program generation device according to claim 1, wherein the changing the first program to generate the second program is based at least in part on a program synthesis using a genetic algorithm.

9. The program generation device according to claim 1, wherein the at least one pair of an input value and an output value is prepared in advance.

10. The computer implemented method according to claim 4, wherein the changing the first program to generate the second program is based at least in part on a program synthesis using a genetic algorithm.

11. The computer implemented method according to claim 4, wherein the at least one pair of an input value and an output value is prepared in advance.

12. The computer-readable non-transitory recording medium according to claim 7, wherein
   the changing further comprises repeating a partial change of the first program in a cumulative manner until the second program is generated.

13. The computer-readable non-transitory recording medium according to claim 7, wherein the changing the first program to generate the second program is based at least in part on a program synthesis using a genetic algorithm.

14. The computer-readable non-transitory recording medium according to claim 7, wherein the at least one pair of an input value and an output value is prepared in advance.

15. The computer-readable non-transitory recording medium according to claim 12, wherein
   the changing further comprises changing a portion of the first program using a plurality of program components.

\* \* \* \* \*